United States Patent [19]
Ittleson et al.

[11] Patent Number: 6,082,291
[45] Date of Patent: Jul. 4, 2000

[54] FIXTURE FOR USE IN DISPOSING A REGION OF MATERIAL ON THE SHROUD OF A ROTOR BLADE

[75] Inventors: Alan J. Ittleson, Middletown; Jeffrey B. Johnson, Wallingford; Jeffrey J. Bayer, Manchester; Dennis J. Bacon, Guilford; Jamie W. O'Brien, Wallingford, all of Conn.

[73] Assignee: United Technologies Corporation, Hartford, Conn.

[21] Appl. No.: 08/994,781

[22] Filed: Dec. 19, 1997

[51] Int. Cl.⁷ ..................................................... B05C 13/00
[52] U.S. Cl. ........................... 118/500; 118/503; 118/504; 118/505
[58] Field of Search ...................................... 118/500, 503, 118/504, 505; 228/47.1, 49.1, 49.2

[56] References Cited

U.S. PATENT DOCUMENTS

| | | | |
|---|---|---|---|
| 4,530,861 | 7/1985 | Sippel et al. | 118/505 |
| 5,607,561 | 3/1997 | Gruver et al. | 118/500 |
| 5,630,879 | 5/1997 | Eichmann et al. | 118/500 |
| 5,792,267 | 8/1998 | Marszal et al. | 118/500 |

*Primary Examiner*—Laura Edwards
*Attorney, Agent, or Firm*—Gene D. Fleischhauer

[57] ABSTRACT

A fixture 14 for use in applying a material to a face 16,18 of a rotor blade 10 is disclosed. Various construction details are developed which reduce rework of the rotor blade and facilitate application of the material are developed. In one embodiment, a pad 48 has a surface 50 which blocks the flow of molten material to the flow path surface 42 of the shroud 12 of the rotor blade.

26 Claims, 4 Drawing Sheets

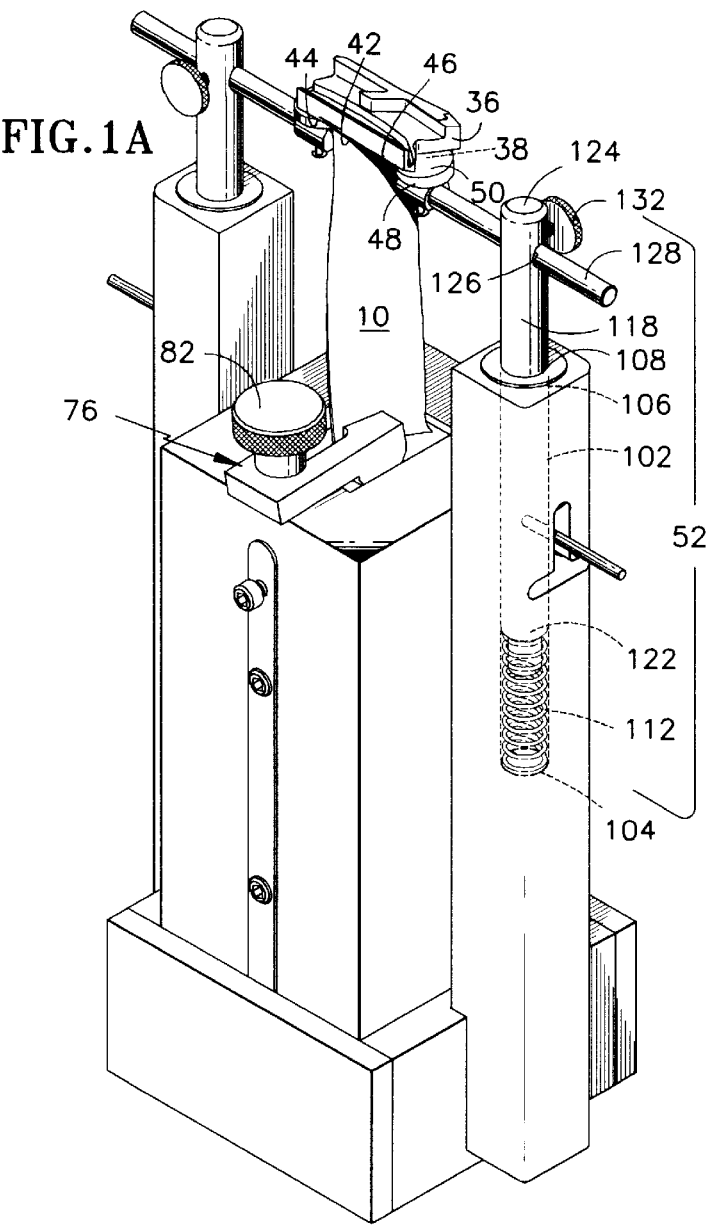
FIG.1A
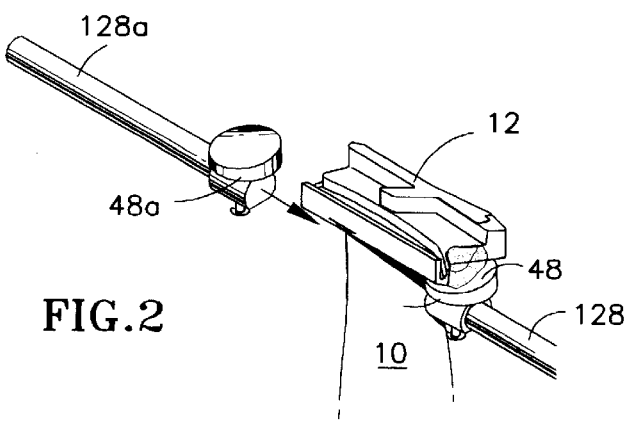
FIG.2
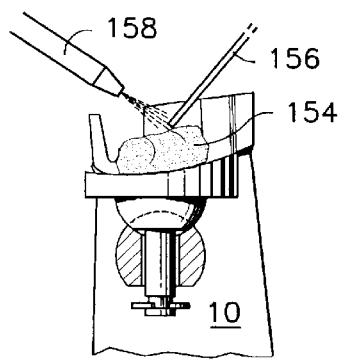
FIG.3
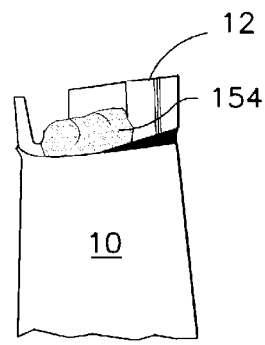
FIG.4
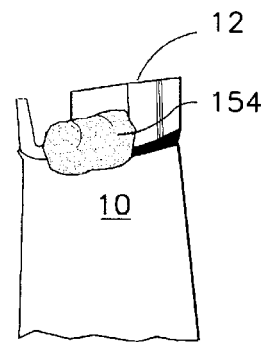
FIG.5
FIG.9
PRIOR ART

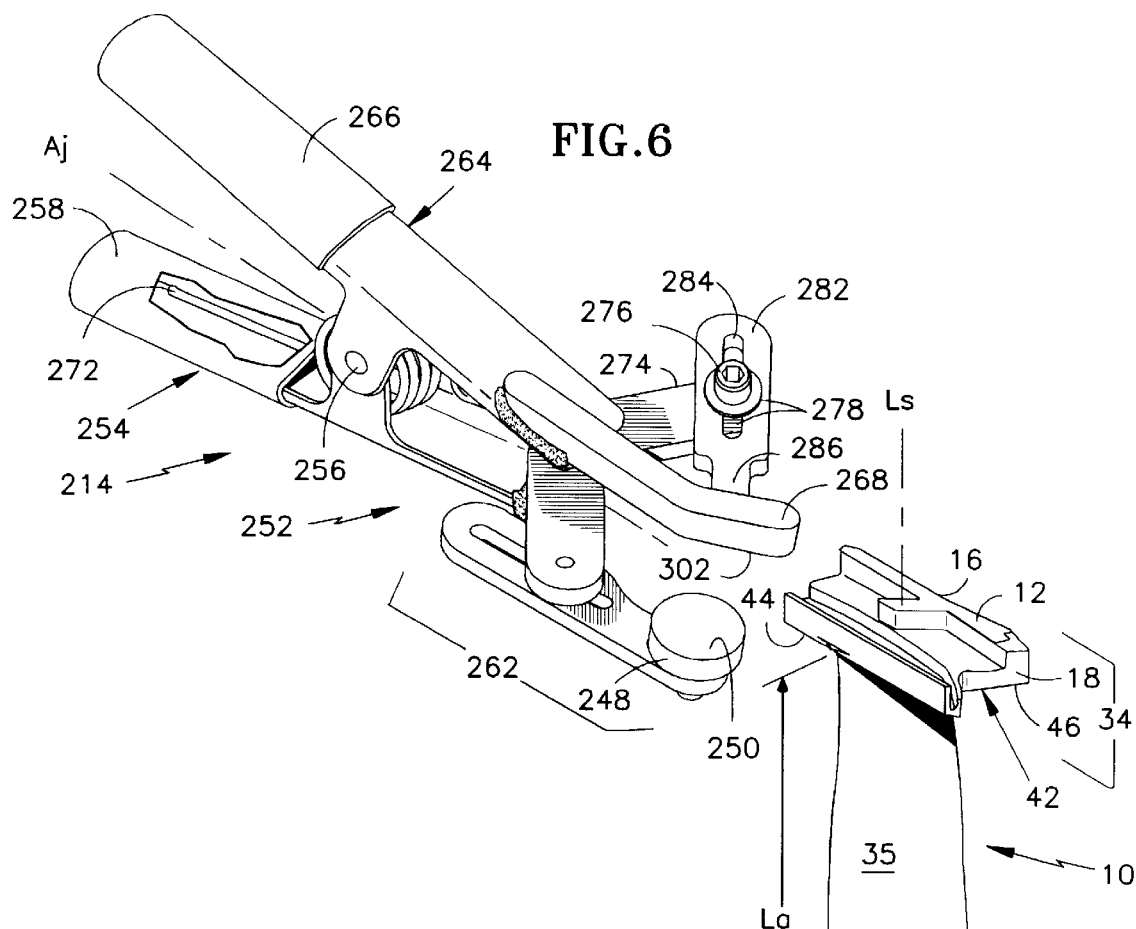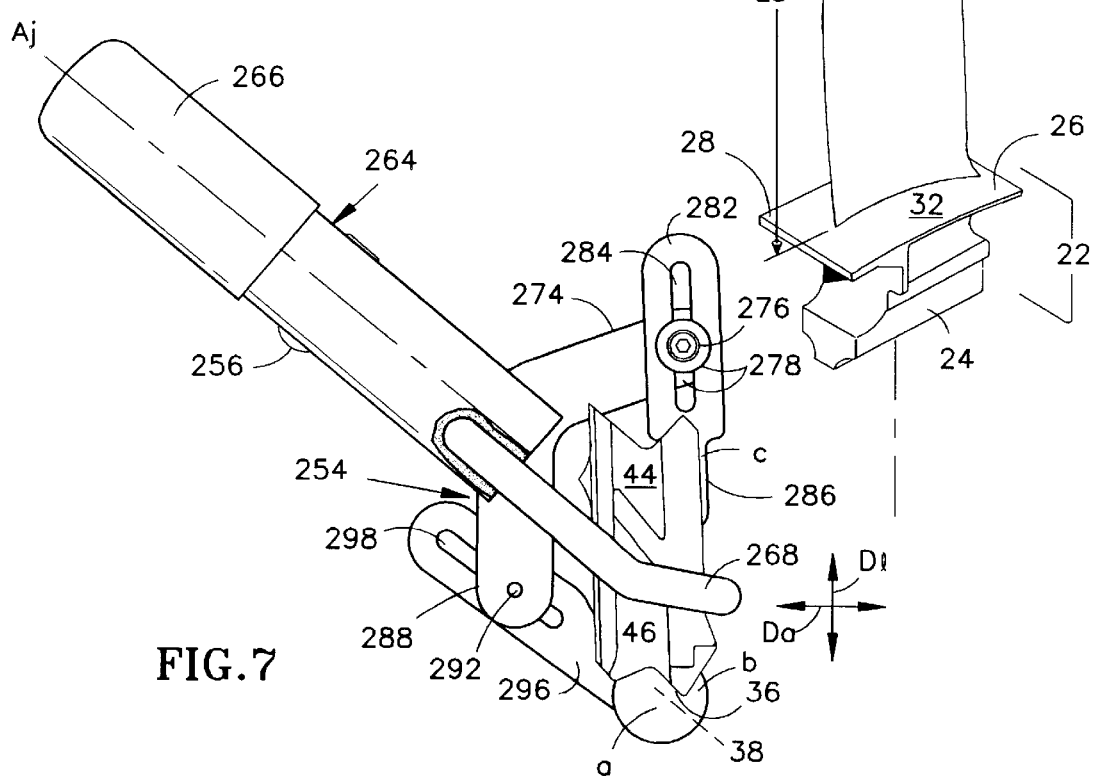

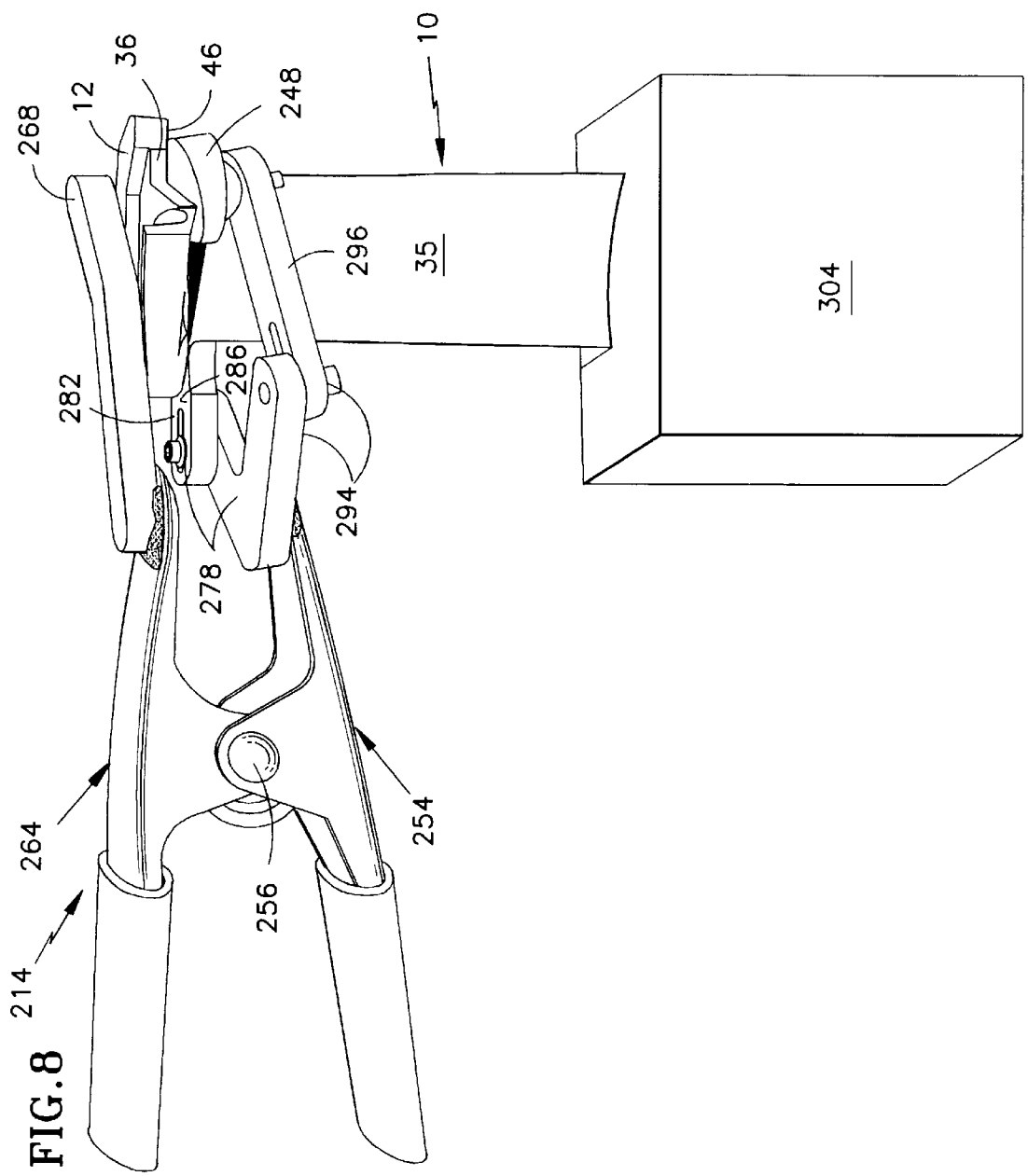

FIXTURE FOR USE IN DISPOSING A REGION OF MATERIAL ON THE SHROUD OF A ROTOR BLADE

CROSS-REFERENCE TO RELATED APPLICATIONS

This application relates to the following co-pending U.S. Applications filed on even date herewith and commonly assigned to the assignee of the subject application: U.S. application Ser. No. 08/994,678, entitled METHOD FOR APPLYING MATERIAL TO A FACE OF A FLOW DIRECTING ASSEMBLY FOR A GAS TURBINE ENGINE, by Ittleson et alia, and U.S. application Ser. No. 08/994,677, entitled CLAMPING FIXTURE FOR A ROTOR BLADE SHROUD, by Ittleson et alia.

TECHNICAL FIELD

This invention relates to axial flow rotary machines and more particularly to a fixture for use in restoring the face of a shroud disposed on a rotor blade for such a machine.

BACKGROUND ART

Axial flow rotary machines, such as gas turbine engines used for the propulsion of aircraft, have rotor assemblies disposed within the engine. Each rotor assembly is used to transfer energy between the rotor assembly and gases flowed through the engine. The rotor assembly is commonly provided with rotor disks each having a plurality of rotor blades.

Each rotor blade typically has a root which adapts the blade to engage a corresponding groove in the disk for retention of the rotor blade. An airfoil extends outwardly from the root and has a convex side and a concave side for interacting with the working medium gases. The rotor blade may also be provided with a shroud, such as a tip shroud at the outer end of the airfoil. Each shroud has laterally (circumferentially) extending faces and axial extending faces. An example of an axially extending face is the notch face. The shroud extends circumferentially to engage the shroud of each of the adjacent rotor blades at the notch face.

During operation of the machine, the rotor blades in the turbine section extend outwardly across the working medium flow path. The rotor blades receive energy from the working medium flow path to drive the rotor assembly about its axis of rotation. In the compression section, the rotor blades transfer energy to the gases to compress the gases as the rotor blades are driven about the axis of rotation by the rotor assembly. As a result, the rotor blades and shrouds are subjected to fluctuating gas flows and high temperatures.

These fluctuating gas flows induce vibrations in the blades which are damped by sliding friction as the shrouds rub against each other. Such rubbing causes wear. The notch face of the shroud at the point of contact has a hard facing material to extend the life of the rubbing surfaces on new blades and is replaced on used blades after the notch becomes worn.

The present invention is concerned with a fixture and method for disposing shroud material, such as a weld material for hard facing a cross notch, on the substrate of a used rotor blade or on a new, rotor blade which is partially formed. Accordingly, the term "rotor blade" includes a partially formed rotor blade having a substrate that adapts the rotor blade shroud to receive such material, or is a used rotor blade having a portion of the shroud surface machined away to form a substrate prior to restoration of the rotor blade.

One method of providing hard facing material to a shroud is to melt hard face material at the notch face by passing an electrical current through the material, such as by welding. This results in a pool of molten material. The molten material is used to build up the thickness of material on the notch face as it hardens. Unfortunately, the pool of molten material coats the top of the shroud, coats the flow path surface beneath the shroud and extends radially past the notch face surface as it hardens.

It is relatively straight forward to remove the deposited material from the top of the shroud because this is not a flow path surface and is easily accessible during the rotor blade fabrication process. The underside of the shroud is a different matter because it includes hard face material protruding from the substrate and attached to the shroud. The protrusion adds weight to the shroud at a critical location and disrupts the aerodynamic smoothness of the flow path surface. The once molten material, now hardened into a lump of hard face material, is removed from the under side of the shroud to decrease rotational stresses in the shroud to acceptable levels and to form a surface having an acceptable aerodynamic smoothness.

One approach is to hand blend the weld material such as by use of a hand held belt sander or hand held surface grinder. Such work is time consuming, ergonomically undesirable and expensive. Machining is not an attractive alternative because of difficulty in locating a partially formed part, such as a rotor blade during manufacture, that has a substrate which receives the molten material. The typical method is to rigidly support the rotor blade for the machining operation by engaging the partially formed root of the rotor blade. A rotor blade with an unfinished roots is difficult to locate using the root as a datum for the machining operation because the location of the shroud then has much variability in a locating fixture. Using a cast block datum around the airfoil is an alternative, but the block prevents access to the underside of the shroud and prevents removing material from the flow path surface located there.

Accordingly, scientists and engineers working under the direction of Applicants' assignee, have sought to develop a method and an apparatus for use with the shrouds rotor blades which decreases the difficulties associated with removing hard face material from the flow path surface of the rotor blade shroud.

SUMMARY OF INVENTION

This invention is in part predicated on the recognition that a very small amount of hard face material may be tolerated on the flow path surface of the shroud providing its mass and its roughness and any protrusion from the surface into the flow path are no greater than limits which are much smaller than the protrusion that presently results from depositing hard face material. For example, for typical rotor blades it was recognized that a protrusion is acceptable providing the protrusion is no greater than ten thousandths of an inch (0.010") with a surface roughness Ra measurement of ninety to one-hundred and fifty (90–150) micro inches as measured in accordance with the procedures set forth in specification "ANSI B46.1-1985 Surface Texture" available from the American National Standards Institute.

According to the present invention, a fixture for disposing a region of material at the shroud face location of a rotor blade has a pad which engages the flow path surface of the shroud and extends beyond the shroud such that the pad blocks the flow of molten material to the flow path surface of the shroud.

In accordance with one embodiment of the present invention, the metal pad has a contoured surface that closely matches the contour of the shroud.

In accordance with the present invention, the melting point of the metal pad is greater than the melting point of the shroud material and the hard face material.

In accordance with one detailed embodiment, the pad is metal and has a thermal conductivity which is greater than the thermal conductivity of the molten material and the adjacent shroud material.

In accordance with another detailed embodiment, the pad has a surface whose contour is a portion of a sphere and has a shaft disposed in a cylindrical opening in the support structure such that the pad is rotatable about the axis of the shaft and the axis can incline with respect to the axis of the opening in which the shaft is disposed.

In one particular embodiment of the present invention, the pad is urged into engagement with the flow path surface of the shroud by an adjustable arm and slidable bar which are spring loaded against the flow path surface of the shroud and the rotor blade is positioned in the fixture with reference to the platform.

In another detailed embodiment, the thermal conductivity and thermal capacitance of the pad are selected such that the heat sink effect of the pad is at an acceptable level which avoids cracking of the weld material by reason of thermal gradients in the weld material during the deposition of the hard face material.

A primary feature of the present invention is the pad of the fixture which engages the flow path surface of the shroud. Another feature is a thermal conductivity of the pad. Still another feature is the rotatable engagement between the pad and the support structure, the pad having a portion of a spherical surface which engages the supporting structure and a shaft which is disposed in a cylindrical opening within the supporting structure.

In one detailed embodiment, a feature is a slidable bar and an adjustable arm which urge the pad into engagement with the flow path surface of the shroud. In one embodiment, the pad is metal. One metal selected is tungsten which has a melting point which is at least three times greater than the melting point of the hard face material.

A principal advantage of the present invention is the efficiency and cost saving which results from eliminating the need to finish the flow path surface of the shroud by reason of the pad which blocks molten material from flowing to the flow path surface of the shroud or blocks molten material from flowing toward the airfoil beyond the flow path surface of the shroud. Another advantage is the ease and speed of installation of the pad to the rotor blade shroud which results from use of adjustable arm and slidable bar to urge the pad into engagement with the shroud. An advantage is the quick seating of the pad against the flow path surface of the shroud in a faying relationship which results from contouring the pad to a contour which closely matches the flow path surface of the shroud and enabling the pad to be rotatable on an axis which may be inclined with respect to the lateral direction of the shroud. An advantage is the durability and integrity of the weld material which results from not allowing the pad to function as a significant heat sink adjacent the hard face material. Still another advantage is the blockage of molten material which results from cooling the portion of molten material adjacent the pad by having the thermal conductivity of the pad greater than the thermal conductivity of the shroud to increase the viscosity of the molten material.

The foregoing features and advantages of the present invention will become more apparent in light of the following detailed description of the best mode for carrying out the invention and accompanying drawings.

BRIEF DESCRIPTION OF THE DRAWINGS

FIG. 1A is an assembled view of a partially formed rotor blade disposed in the fixture shown in FIG. 1.

FIG. 2 is a view of a portion of the fixture shown in FIG. 1 showing the arms of the fixture in the installed position and in the moved position prior to installation.

FIG. 3 is a sectional view taken along the lines 3—3 of FIG. 1, showing the relationship of the pad to the arm.

FIG. 4 is a view corresponding to FIG. 3 showing the deposition of molten material on the shroud.

FIG. 5 is a side elevation view of the shroud of the rotor blade shown in FIGS. 1–4, showing the deposition of molten material at the hard face location of the shroud.

FIG. 6 is a perspective, exploded view of a finished rotor blade and of an alternative embodiment of the fixture shown in FIG. 1 for use in disposing a region of material on the shroud of a rotor blade.

FIG. 7 is a top view of a partially formed rotor blade and the fixture shown in FIG. 6 in its operative engaged position with the rotor blade.

FIG. 8 is a side view of a base for supporting the rotor blade and of the fixture and rotor blade shown in FIG. 7 showing an appendage of the fixture engaging the lateral side of the shroud.

FIG. 9 is a view of a prior art shroud of the rotor blade shown in FIGS. 1–5 showing the relationship of the molten material after deposition on the hard face surface of the shroud, the molten material extending above and below the shroud and hardened at that location.

BEST MODE FOR CARRYING OUT THE INVENTION

Figure 1:
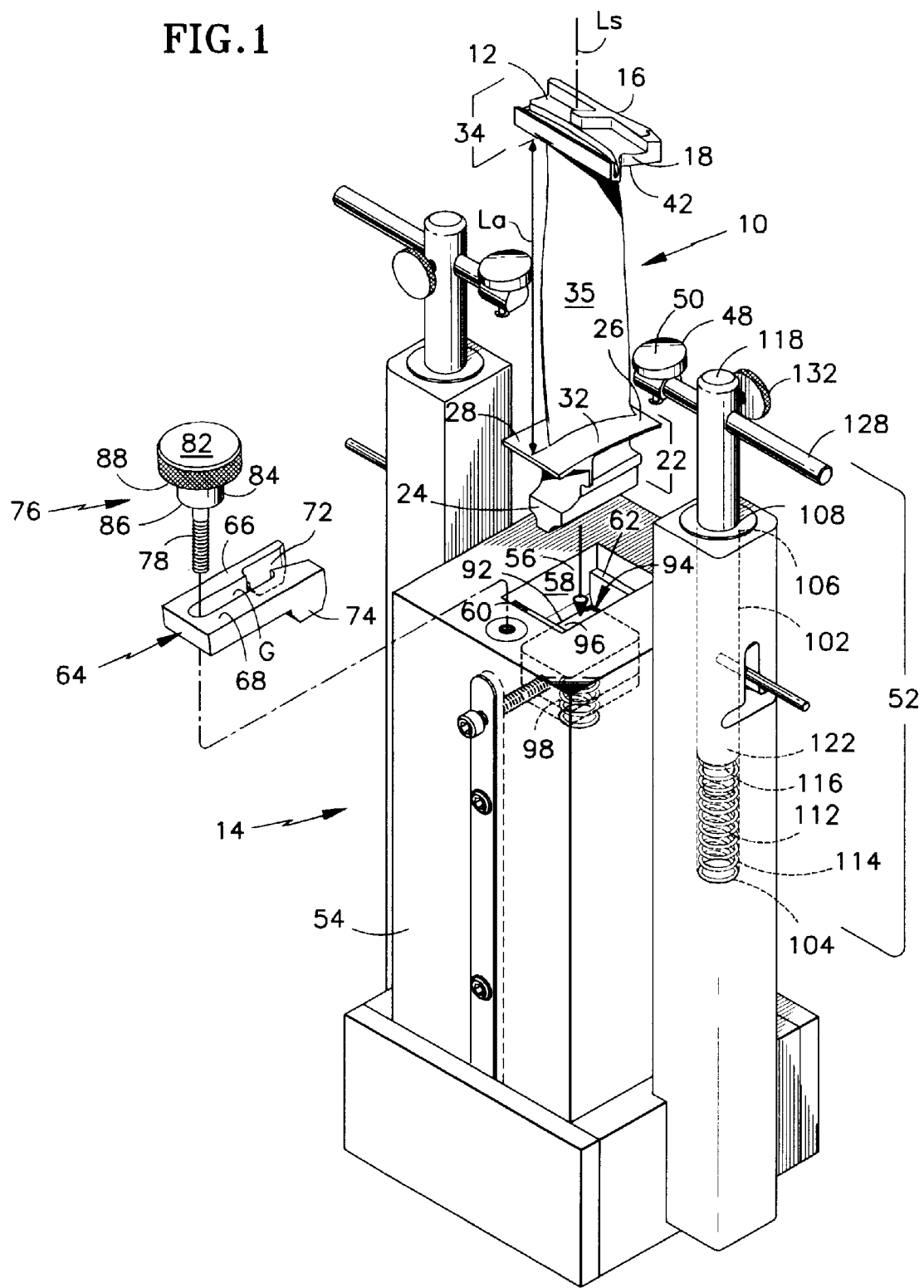
FIG. 1 is a perspective, exploded view of a finished rotor blade and of a fixture for use in disposing material on the shroud of a rotor blade, such as a region of hard material at the notch face location of a rotor blade, with the rotor blade installed in the fixture.

FIG. 1 is an exploded perspective view of a finished rotor blade 10 having a shroud 12; and, a fixture 14 for use in disposing a region of material to the shroud of a rotor blade. The finished blade is shown for purposes of explanation. The blade used with the fixture might be a used rotor blade or a new, partially formed rotor blade as discussed below.

The fixture is shown in exploded fashion to show the relationship of different elements of the fixture to faces 16, 18 of the rotor blade. The face of the rotor blade might extend laterally (circumferentially), such as the face 16, or might extend axially such as the notch face 18. The material is deposited on a substrate of a used rotor blade or on a partially formed rotor blade to form the faces of the shroud shown on the finished rotor blade. For example, parent material might be deposited on the lateral face and hard facing material deposited on the axial, cross notch face. Accordingly, references to the notch face and hardened material that follow are exemplary in nature and do not limit the scope of this disclosure.

The finished rotor blade is shown disposed about a spanwisely extending axis $L_s$. The following description, except for the substrate and notch face, is common to a finished, a partially finished, and a used rotor blade. The rotor blade has a first end 22 having a root section 24 and a platform section 26. The platform section has a first side 28 and a second side 32. The rotor blade has a second end 34. An airfoil section 35 having a length $L_a$ extends spanwisely from the first end to the second end. The second end includes the shroud. The shroud has a first side and a second side which extend laterally with respect to the airfoil.

FIG. 1A is an assembled view of the fixture shown in FIG. 1 and shows the fixture 14 in its operatively engaged position with a used or a partially formed rotor blade 10. The shroud of the partially formed blade has a substrate, such as a notch substrate 36, for receiving hardened material. A notch face location 38 is spaced laterally from the substrate. Hard faced material is applied to the substrate until the hard face material extends through and beyond the notch face location. Thereafter, the blade will be machined to its final form, with the finished notch face 18 on the rotor blade extending to and located at the notch face location 38.

As shown in FIG. 1 and FIG. 1A, the shroud has a flow path surface 42 having a first side 44 and a second side 46. The fixture 14 has a pad 48 having a surface 50 and means, that is, an assembly, as represented by the assembly 52, for urging the pad into engagement with the flow path surface 42 of the shroud. The pad 48 has a surface 50 which adapts the pad to engage the flow path surface 42 of the shroud 12 of the rotor blade.

The fixture includes a base 54 which is adapted to engage the root section 24 of the rotor blade. The base has a passage 56 having an opening 58 which adapts the base to receive the first end 22 of the rotor blade. The base supports the rotor blade during operations that are performed on the shroud of the rotor blade. The base might be integrally formed with the assembly that urges the pad into engagement with the flow path surface 42 of the shroud, or the assembly urging the pad might be separately formed from the base as is shown in Applicants' application Ser. No. (EH-10129), entitled Clamping Fixture For A Rotor Blade Shroud, by Ittleson et alia, the material of which is incorporated herein by reference and is discussed with regard to FIGS. 6, 7 and 8.

The base has a first surface 60 facing outwardly and bounding a portion of the passage. A second surface 62 disposed across the passage faces outwardly and bounds a portion of the passage. The surfaces adapt the fixture to engage the sides 28,32 of the platform section 26 of the rotor blade 10 in its unfinished condition. The opening of the passage extends inwardly from the first surface and the second surface and adapts the base to receive the root section 24 of the rotor blade.

The base is provided with a clamp 64 having a pair of arms 66,68 extending laterally. The arms are spaced apart leaving a gap G therebetween which adapts the clamp to extend on either side of the airfoil section 35 of the rotor blade. Each of the arms has a projection 72,74 which extends from the arms. The projections adapt the arms to each engage one of the sides of the platform section of the rotor blade. In the operative condition as shown in FIG. 1A, the platform section is trapped between the arms of the clamp and the outwardly facing first and second surfaces 60,62 of the opening 58.

A screw fastener 76 has a rod 78 that threadably engages the base 54 for urging the arms 66,68 of the clamp against the platform section of the rotor blade. The screw fastener has a head 82. A spacer 84 has a first end 86 which engages the arms of the clamp and a second end 88 which is adapted to engage the head of a screw fastener. The spacer further has an opening which extends from the first end to the second end of the spacer and which adapts the spacer to receive the rod of the screw fastener. In an alternate construction, the screw fastener is made as a one piece assembly having a spacer integral with the head of the screw fastener.

A channel 92 extends inwardly from the opening 58. A ground assembly 94 includes a grounding block 96 disposed in the channel. The grounding block is adapted to engage the root section 24 of the rotor blade element during the welding operation. An elastic element, as represented by the spring 98, is adapted to exert a force against the grounding block to urge the grounding block into abutting contact with the rotor blade under operative conditions. Alternatively, the elastic element might be a pneumatic or hydraulic device.

As shown in FIG. 1 and in FIG. 1A with an unfinished rotor blade 10, a housing assembly 52 is the assembly for urging the pad into engagement with the flow path surface of the shroud section of an unfinished rotor blade. Alternatively, the assembly might be a clamp construction as shown in U.S. application Ser. No. 08/994,677, or any another construction which is able to urge a pad against the underside of the flow path surface of the shroud. Examples are pneumatic or hydraulic devices attached to a base or to the rotor blade for support or independent of both the base and the rotor blade.

The housing assembly has a passage 102 having a first end 104 and a second end 106. The second end has an opening 108. An elastic element, such as a spring 112, is disposed in the passage. The spring has a first end 114 which engages the first end of the passage and a second end 116 which faces outwardly. A bar 118 is disposed in the passage. The bar 118 has a first end 122 which engages the elastic element and a second end 124 extending beyond the passage. The second end has a channel 126 which adapts the bar to receive an arm.

An arm 128 extends through the channel 126 of the bar 118 to slidably engage the bar. FIG. 2 shows the pad 48 in the engaged position and the pad 48a in the non-engaged position. The arm is moveable outwardly by movement of the bar and laterally by releasing a fastener 132 to enable movement of the arm in the directions shown in FIG. 2. The screw fastener threadably engages the bar and extends through the channel. The screw fastener exerts a force on the arm to secure the arm against movement once the arm is adjusted to the correct lateral location, as shown in FIG. 2.

FIG. 3 is a side elevation view of the shroud 12, of the pad 48, and of the arm 128 of the assembly 52 for urging the pad into engagement with the flow path surface of the shroud. The arm of the assembly 52 has an opening 142 bounded by a first surface 144 having the contour of a portion of a sphere and a cylindrical surface 146 which extends from the first surface. The cylindrical surface is disposed about an axis $A_r$. The axis $A_r$ extends through the center of the sphere.

The pad 48 has a first surface 148 having the contour of a portion of a sphere. The first surface rotatably engages the spherically shaped surface 144 of the arm 128. A cylindrical shaft 152 extends from the first surface. The cylindrical shaft has a axis rotation of $A_s$. The axis of rotation $A_s$ is alignable with the axis $A_r$ of the opening in the arm such that the shaft is disposed in the opening and spaced radially from the cylindrical surface of the arm. This enables the pad to displace itself slightly by inclining the axis $A_s$ or rotating about the axis $A_s$.

The surface 50 of the pad is a second surface on the pad 48 having a contour which closely matches the contour of the flow path surface 42 of the shroud. The second surface adapts the pad to engage the flow path surface of the shroud and extends laterally beyond the hard face location of the shroud and beyond the edge of the shroud such that the pad in the engaged position blocks the flow of molten material to the flow path surface of the shroud. Thus, the second surface closely matches the contour of the shroud to an extent which avoids deposition of an unacceptable amount of material on the flow path surface of the shroud and insures that any deposition is within acceptable limits set by aerodynamic and structural concerns. As will be realized, in some embodiments the amount of deposition may require a small amount of rework to bring the flow path surface within acceptable limits. This might occur if the second surface was deliberately contoured to provide this result for reasons unconnected with aerodynamic or structural concerns.

FIG. 4 schematically represents the deposition of the hard face material 154 at the notch face location 38 on the shroud. As shown in FIG. 4, suitable welding wire 156 is in contact with the molten material 154. An arc of a welding torch 158 is used to supply electrical current and heat to the weld wire and hard face material to cause melting of the weld wire and hard face material adjacent the notch face location.

FIG. 5 shows the hard face material 154 at the end of the deposition process. The hard face material is shown extending above a portion of the shroud. The hard face material only extends below a portion of the shroud to a slight extent as a result of the faying relationship between the pad 48 and the underside 42 of the shroud. The amount of material which may extend under the shroud after use of the pad is so small that it results in a projection of acceptable size that does not require further rework. For example, in one particular trial, the projection without the pad (see FIG. 9) was nearly one-sixteenth of an inch (0.0625") and commonly an eighth of one inch (0.125") depending on the skill of the welder. Using the pad with hundreds of rotor blades having a lengths varying from about three (3) inches to twelve (12) inches resulted in a projection that was less than ten thousandths of an inch (0.010") with a surface roughness measurement Ra that is less than the range of ninety to one-hundred and fifty micro inches (90–150 micro inches). This projection was aerodynamically acceptable and does not require further finishing of the flow path surface of the shroud. In fact, in many applications, the projection was less than five-thousandths of an inch with a surface roughness measurement Ra that was less than seventy micro-inches.

FIGS. 6, 7 and 8 are a view of an alternate embodiment of the construction shown in FIGS. 1 and 1A. In this embodiment, the rotor blade is supported by a separate base 304.

As shown in FIG. 6 and FIG. 7, the shroud has a flow path surface 42 having a first side 44 and a second side 46. The fixture 214 has a pad 248 having a surface 250 and an assembly, as represented by the assembly 252, for urging the pad into engagement with the flow path surface 42 of the shroud. The assembly has a pair of jaws 254,264 which rotatably engage each other at a pivot 256. The pair of jaws is formed of the first jaw 254 having a first end 258 and a second end 262; and, the second jaw 264 having a first end 266 and a second end 268. The jaws are disposed about and moveable toward an axis $A_j$ of the assembly by an element, as represented by the spring element 272, for urging the first end of the jaws apart and the second end of the jaws together.

The first jaw has a first side 274. The first side has a pin 276 and a pair of spaced apart surfaces 278. A first appendage 282 is disposed between the surfaces. The appendage has a slot 284 in which the pin is disposed such that the appendage is slidably and rotatably attached to the jaw to permit movement in the axial $D_a$ and lateral $D_l$ directions. The first appendage has a surface 286. The surface 286 adapts the appendage to engage the flow path surface 42 on the first side 44 of the shroud 12.

The first jaw 254 has a second side 288. The second side has a pin 292 and a pair of spaced apart surfaces 294 as does the first side 274 of the jaw. A second appendage 296 is disposed between the spaced apart surfaces on the second side. The second appendage has a slot 298 in which the pin 292 is disposed such that the appendage is slidably and rotatably attached to the jaw and permits movement in the axial and lateral directions.

The second jaw 264 of the assembly 252 faces oppositely to the first and second sides 274,288 of the first jaw 254. The second jaw at the second end 268 is disposed laterally between the first side 274 and the second side 288 of the first jaw. The second jaw has a surface 302 which adapts the second jaw to engage the non-flow path side of the shroud.

As shown in FIG. 7, the pin 276 has been loosened and the first appendage 282 rotated and moved laterally and axially with respect to the first side 274 of the first jaw 254 such that the surface 286 of the appendage engages the underside or flow path surface 42 of the first side 44 of the shroud 12. Similarly, the second appendage 296 has been adjusted such that the attached pad 248 is in its operative position. The surface 250 of the pad engages the flow path surface of the shroud. The surface 250 has two points a,b on the surface which, with a point c on the surface of the first appendage, define a plane which is substantially parallel to the flow path surface of the shroud. The pad extends laterally beyond the notch face location 38 of the shroud 12 (the distance between the notch face location 38 and the substrate 36 is exaggerated) to engage the flow path surface 42 of the shroud and beyond the shroud such that the pad in the engaged position is adapted to block the flow of molten material to the flow path surface of the shroud.

FIG. 8 is a side view of the fixture 214 and the unfinished (partially formed) rotor blade 10 shown in FIG. 2 in the engaged position. FIG. 8 shows the appendages 282,296, of the fixture engaging the lateral sides 44,46 of the flow path surface 42 of the shroud. In addition, FIG. 8 shows a base 304 for engaging the rotor blade 10 to support the rotor blade as the hard facing operation takes place.

During operation of the fixture shown in FIGS. 1 and 1A, rotor blade after rotor blade is installed in the fixture and welded. Each blade is quickly removed and a new blade installed by releasing the threaded fastener and tightening it. The rotor blade is positioned by the platform section which, compared to the root section in a partially finished blade, is a much better datum. The arm 128 and bar 118 which engage the spring 112 are easily moved, compressing the spring. The pad is moved into position against the new blade, with compression of the spring accommodating differences in height between rotor blades. These differences might occur for the same type of rotor blade or for different types of rotor blades as the new blade is installed because of the partially formed nature of the blade and slight differences in orientation of the blade in the fixture. A new type of rotor blade may require a different size pad 48 which is easily installed by releasing the threaded fastener 132, sliding the arm out of engagement and disposing a new arm with a pad attached in the fixture or simply removing the clip retainer from the shaft 152 of the pad and replacing the small pad with a larger pad.

The pad 48 is easily and quickly adjusted into a faying relationship with the underside of the flow path surface of the shroud by reason of its ability to rotate about axis $A_s$ and to incline slightly with respect to the axis $A_r$ of the opening in the arm 128 of the assembly 52. Thus, the pad is quickly seated in the event that engagement of the clamp with the platform section of the rotor blade has caused a small misalignment of the rotor blade in the fixture. A particular advantage is the engagement of the airfoil outwardly of the partially formed root. This eliminates variations in engagement associated with such a root and speeds set up time in the fixture.

The thermal conductivity of the pad 48 is greater than the thermal conductivity of the hard face material 154 and the shroud 12. A tungsten pad, which has been used to good effect, has a thermal conductivity that is normally four times greater than the thermal conductivity of the molten material and the shroud at operative temperatures. As the weld material 154 is deposited on the pad at the hard face location, the pad conducts the heat away from the molten material adjacent the line of faying contact between the shroud and the pad at a faster rate than at the shroud. This causes the molten material to become more viscous at that location, blocking the leakage of molten material to the flow path surface of the shroud. The thermal capacitance of the shroud (the mass of the material multiplied by the specific heat at constant pressure) is established such that the pad does not act as a heat sink of such a size that cracking of molten material occurs as it cools. Thus, even though the thermal conductivity is high with respect to the material on the shroud, the thermal capacitance of the pad is such that cracking of the molten material is avoided.

The melting point of the pad is greater than the melting point of the shroud or the molten material. This avoids attaching the pad to the shroud. A melting point of two, three or four times the molten material is desirable to provide a factor of safety. In fact, a tungsten pad will have a melting point that is about four times the melting point of the molten material.

A particular advantage of the present invention is avoiding or reducing the necessity of finishing the flow path surface of the shroud. Hand grinding and hand sanding of the flow path surface of the shroud is one way of removing excess molten material which cannot be tolerated for aerodynamic purposes. This is an undesirable operation in terms of time and impact on personnel performing the operation. The repetitive motion of moving the grinding wheel with respect to the surface to obtain an acceptable finish without damaging the flow path surface of the shroud may adversely effect muscles and tendons of the arm required to repeatedly perform that motion. In addition, even the most conscientious and most skilled personnel may occasionally injure the flow path surface of the shroud by over grinding or over sanding the flow path surface of the shroud resulting in scrapping of the part.

A particular advantage of the construction shown in FIGS. 6, 7 and 8 is the orientation of the assembly 252 for urging the pad into engagement with the shroud. For example, the spanwise length of the assembly is about six tenths of an inch below the shroud. The fixture leaves free and unencumbered the region between the fixture and the airfoil which amounts to at least seventy-percent of the region for an airfoil of about three inches to nearly ninety-five percent for an airfoil of about twelve inches. In addition, the fixture does not extend beyond the pad. This provides room for the welder to manipulate the welding device and facilitates welding.

After completion of the deposition of the hard face material, the rotor blade is removed from the fixture, encapsulated in a block of material to provide datum for the machining operations and machined to its final contour at the root platform and shroud sections of the rotor blade. Alternatively, the airfoil might be fixtured in a hard point fixture which engages other datums on the airfoil.

Although the invention has been shown and described with respect to detailed embodiments thereof, it should be understood by those skilled in the art that various changes in form and detail thereof may be made without departing from the spirit and the scope of the claimed invention.

We claim:

1. A fixture for use in disposing a region of hardened material at a shroud face location for a rotor blade, the rotor blade being disposed about a spanwise axis, the rotor blade having a first end having a root section, an airfoil section which extends spanwisely, and a second end having a shroud extending laterally with respect to the airfoil, the shroud having a flow path surface, a shroud face location and a substrate for receiving the hardened material adjacent the shroud face location in molten form, which comprises:

a base which engages the rotor blade;

an assembly for urging a pad into engagement with the flow path surface of the shroud;

a pad having a contour which adapts the pad to engage the flow path surface of the shroud, the surface being adapted to extend laterally beyond the hard face location of the shroud and beyond the shroud such that the pad in the engaged position blocks the flow of molten material to the flow path surface of the shroud.

2. The fixture for use in disposing a region of material at a shroud face location for a rotor blade as claimed in claim 1 wherein at least the portion of the pad adjacent the substrate is formed of a material having a thermal conductivity which is greater than the thermal conductivity of the molten material and the shroud at operative temperatures to conduct heat away from molten material adjacent the line of faying contact between the shroud and the pad to cool the molten material at the line of faying contact to cause the molten material to become more viscous at that location to block the leakage of molten material to the flow path surface of the shroud.

3. The fixture for use in disposing a region of material at a shroud face location for a rotor blade as claimed in claim 2 wherein the material of the pad is at least four times the thermal conductivity of the molten material and the shroud at operative temperatures.

4. The fixture for use in disposing a region of material at a shroud face location for a rotor blade as claimed in claim 3 wherein the pad has a thermal capacitance which is less than the thermal capacitance of the shroud to avoid the pad acting as a heat sink and cracking the molten material as it cools.

5. The fixture for use in disposing a region of material at a shroud face location for a rotor blade as claimed in claim 4 wherein the pad is metal.

6. The fixture for use in disposing a region of material at a shroud face location for a rotor blade as claimed in claim 5 wherein the pad is tungsten.

7. The fixture for use in disposing a region of material at a shroud face location for a rotor blade as claimed in claim 2 wherein the pad is metal.

8. The fixture for use in disposing a region of material at a shroud face location for a rotor blade as claimed in claim 1 wherein the pad rotatably engages the assembly for urging the pad into engagement with the flow path shroud.

9. The fixture for use in disposing a region of material at a shroud face location for a rotor blade as claimed in claim 8 wherein the assembly for urging the pad into engagement with the flow path shroud has an opening bounded by a first surface having the contour of a portion of a sphere and a cylindrical surface disposed about an axis $A_r$, the axis $A_r$ extending through the center of the sphere and wherein the pad has a cylindrical shaft having an axis of rotation As and alignable with the axis of rotation Ar such that the shaft is disposed in the opening and spaced radially from the cylindrical surface of the arm, the pad further having a spherically shaped surface from which the shaft extends, the spherically shaped surface rotatably engaging the spherically shaped surface of the assembly for urging the pad into engagement with the flow path shroud and wherein the pad is rotatable about the axis As and the axis As is tiltable through the engagement of the spherical surfaces on the pad and the arm to enable the second surface of the shroud to accommodate minor variations in the orientation of the shroud with respect to the fixture and enable the second surface to engage the flow path surface of the shroud.

10. The fixture for use in disposing a region of material at a shroud face location for a rotor blade as claimed in claim 1 wherein the assembly for urging the pad into engagement with the flow path shroud is a housing having a passage, an elastic element disposed in the passage having a first end which engages the housing and a second end which is adapted to engage a bar and a bar disposed in the passage which engages the elastic element, the bar being attached to the pad to urge the pad into engagement with the flow path surface of the shroud.

11. The fixture for use in disposing a region of material at a shroud face location for a rotor blade as claimed in claim 10 wherein the bar has a first end which engages the spring and a second end extending beyond the passage having a channel which adapts the bar to receive an arm and wherein an arm extends through the channel in the bar to slidably engage the bar and has an end spaced from the bar which is attached to the pad.

12. The fixture for use in disposing a region of material at a shroud face location for a rotor blade as claimed in claim 1 wherein the base has a passage which adapts the base to receive the first end of the rotor blade.

13. The fixture for use in disposing a region of material at a shroud face location for a rotor blade as claimed in claim 1 wherein the fixture includes a ground assembly having a ground which is adapted to engage the root section of the rotor blade and means for urging the ground and the rotor blade into abutting contact.

14. The fixture for use in disposing a region of material at a shroud face location for a rotor blade as claimed in claim 1 wherein the fixture includes a ground assembly having a ground which is adapted to engage the root section of the rotor blade and means for urging the ground and the rotor blade into abutting contact.

15. A fixture for use in disposing a region of hardened material at the notch face location for a rotor blade, the rotor blade being disposed about a spanwise axis which has a first end having a root section and a platform section, the platform section having a first side and a second side extending laterally with respect to the spanwise axis, which has an airfoil section which extends spanwisely and which has a second end having a shroud extending laterally with respect to the airfoil, the shroud having a flow path surface a notch face location and a substrate for receiving the hardened material adjacent the notch face location in molten form, which comprises:

a base having a passage which adapts the base to receive the first end of the rotor blade, the base further including, a first surface facing outwardly and bounding a portion of the passage, a second surface facing outwardly and bounding a portion of the passage, an opening of the passage which extends inwardly from the first surface and the second surface, and which adapts the base to receive the root section of the rotor blade, a clamp having a pair of arms extending laterally, the arms being spaced apart leaving a gap therebetween, the gap adapting the clamp to extend on either side of the airfoil, each of the arms having a projection which extends from the arm and adapts the clamp to engage one of the sides of the platform section of a rotor blade in the operative condition to trap the platform section between the arms of the clamp and the outwardly facing first and second surfaces of the opening, a spacer having a first end which engages the arms of the clamp and a second end which is adapted to engage the head of the screw fastener, the spacer further having an opening that extends from the first end to the second end of the spacer which adapts the spacer to receive the rod of the screw fastener, a screw fastener having a rod that threadably engages the base for urging the arms of the clamp against the platform section of the rotor blade, the screw fastener having a head which engages an end of a spacer for urging the spacer against the arms of the clamp, a channel extending inwardly from the opening which is adapted to receive a grounding block;

a ground assembly which includes a grounding block disposed in the channel which is adapted to engage the root section of the rotor blade, an elastic element which is adapted under operative conditions to exert a force against the grounding block for urging the grounding block into abutting contact with the rotor blade element under operative conditions, a housing assembly for urging a pad assembly into engagement with the flow path surface of the shroud section, the housing assembly including:

a housing having a passage having a first end which is adapted to engage an elastic element and a second end having an opening which adapts the passage to receive a bar, an elastic element disposed in the passage having a first end which engages the first end of the passage and a second end which is adapted to engage a bar, a bar disposed in the passage having a first end which engages the spring and a second end extending beyond the passage having a channel which adapts the bar to receive an arm, an arm which extends through the channel in the bar to slidably engage the bar and which has an end spaced from the bar, the end having an opening bounded by a first surface having the contour of a portion of a sphere and a cylindrical surface disposed about an axis $A_r$, the axis $A_r$ extending through the center of the sphere, a screw fastener which threadably engages the bar and which extends to the channel for exerting a force on the arm to secure the arm against movement, a pad having a cylindrical shaft having an axis of rotation As and alignable with the axis of rotation Ar such that the shaft is disposed in the opening and spaced radially from the cylindrical surface of the arm, the pad having a first surface from which the shaft extends, the first surface having the contour of a portion of a sphere and which rotatably engages the spherically shaped surface of the arm, a second surface having a contour which closely matches the contour of the flow path surface of the shroud and which adapts the pad to engage the flow path surface of the shroud and which extends laterally beyond the hard face location of the shroud and beyond the shroud such that the pad in the engaged position blocks the flow of molten material to the flow path surface of the shroud, wherein the elastic element urges the bar outwardly and against the flow path surface of the shroud to accommodate differences in height between rotor blades;

wherein the screw fastener engages the arm to permit lateral adjustment of the arm with respect to the shroud of the rotor blade;

wherein the pad is rotatable about the axis As and the axis As is tiltable through the engagement of the spherical surfaces on the pad and the arm to enable the second surface of the shroud to accommodate minor variations in the orientation of the shroud with respect to the fixture and enable the second surface to engage the flow path surface of the shroud;

wherein at least the portion of the pad adjacent the second surface is formed of a material having a thermal conductivity which is at least four times the thermal conductivity of the molten material and the shroud at operative temperatures to conduct heat away from molten material adjacent the line of faying contact between the shroud and the pad to cool the molten material at the line of faying contact to cause the molten material to become more viscous at that location to block the leakage of molten material to the flow path surface of the shroud; and, wherein the pad has a thermal capacitance which is less than the thermal capacitance of the shroud to avoid the pad acting as a heat sink and cracking the molten material as it cools.

16. The fixture for use in disposing a region of hardened material at the notch face location for a rotor blade as claimed in claim 15 wherein the pad is metal.

17. The fixture for use in disposing a region of hardened material at the notch face location for a rotor blade as claimed in claim 15 wherein the pad is tungsten.

18. The fixture for use in disposing a region of hardened material at the notch face location for a rotor blade as claimed in claim 15 wherein the pad is formed of a material having a melting point greater than the melting point of the shroud material and the hard face material.

19. The fixture for use in disposing a region of material at a shroud face location for a rotor blade as claimed in claim 1 wherein the pad is formed of a material having a melting point greater than the melting point of the shroud material and the hard face material.

20. The fixture for use in disposing a region of material at a shroud face location for a rotor blade as claimed in claim 2 wherein the pad is formed of a material having a melting point greater than the melting point of the shroud material and the hard face material.

21. The fixture for use in disposing a region of material at a shroud face location for a rotor blade as claimed in claim 8 wherein the pad is formed of a material having a melting point greater than the melting point of the shroud material and the hard face material.

22. The fixture for use in disposing a region of material at a shroud face location for a rotor blade as claimed in claim 1 wherein the pad is formed of a material having a melting point three times greater than the melting point of the shroud material and the hard face material.

23. The fixture for use in disposing a region of material at a shroud face location for a rotor blade as claimed in claim 2 wherein the pad is formed of a material having a melting point three times greater than the melting point of the shroud material and the hard face material.

24. The fixture for use in disposing a region of material at a shroud face location for a rotor blade as claimed in claim 8 wherein the pad is formed of a material having a melting point three times greater than the melting point of the shroud material and the hard face material.

25. The fixture for use in disposing a region of material at a shroud face location for a rotor blade as claimed in claim 7 wherein the pad is formed of a material having a melting point three times greater than the melting point of the shroud material and the hard face material.

26. The fixture for use in disposing a region of material at a shroud face location for a rotor blade as claimed in claim 4 wherein the pad is formed of a material having a melting point three times greater than the melting point of the shroud material and the hard face material.

* * * * *